United States Patent [19]

Kaneko

[11] Patent Number: 5,089,901
[45] Date of Patent: Feb. 18, 1992

[54] IMAGE READING APPARATUS

[75] Inventor: Yutaka Kaneko, Yokohama, Japan

[73] Assignee: Ricoh Company, Ltd., Tokyo, Japan

[21] Appl. No.: 298,895

[22] Filed: Jan. 19, 1989

[30] Foreign Application Priority Data

Jan. 20, 1988 [JP] Japan .................. 63-5420[U]
Jan. 20, 1988 [JP] Japan .................. 63-5421[U]
Jan. 26, 1988 [JP] Japan .................. 63-14995
Mar. 14, 1988 [JP] Japan .................. 63-59999

[51] Int. Cl.$^5$ .................. H04N 1/04; H01J 40/14
[52] U.S. Cl. .................. 358/474; 358/494; 358/496; 250/208.1
[58] Field of Search ............ 358/474, 213.13, 213.11, 358/494, 482, 483, 496, 498; 250/578, 208.1

[56] References Cited

U.S. PATENT DOCUMENTS

| | | | |
|---|---|---|---|
| 4,356,513 | 10/1982 | Yoshimura et al. | 358/483 |
| 4,543,491 | 9/1985 | Tateoka et al. | 358/213.13 |
| 4,641,199 | 2/1987 | Miyagi | 250/578 |
| 4,675,745 | 6/1987 | Suzuki | 250/578 |

*Primary Examiner*—Joseph A. Orsino
*Assistant Examiner*—Thomas D. Lee
*Attorney, Agent, or Firm*—Oblon, Spivak, McClelland, Maier & Neustadt

[57] ABSTRACT

An image reading apparatus for reading an image of a document by dividing the image into a plurality of sections in the main scanning direction and causing independent solid-state imaging devices to read those image sections. A displacement of the document from a correct reading position is detected. An effective pixel area for reading of each of the imaging devices is varied on the basis of the detected displacement of the document.

9 Claims, 15 Drawing Sheets

IMAGE READING APPARATUS

BACKGROUND OF THE INVENTION

The present invention relates to an image reading apparatus for reading an image printed on a document by focusing the image on a solid-state imaging device through optics and more particularly, to an image reading device of a type which divides a document image into a plurality of sections in the main scanning direction and causing independent solid-state imaging devices to read the sections of the image.

In an image reading apparatus or image reader of the type described, an image on a document is divided into first and second sections, for example, in the main scanning direction of the document. The first and second image sections are respectively focused onto a first and a second solid-state imaging device by optics implemented by a first focusing lens and a second focusing lens, whereby the entire image contiguous in the main scanning direction is read out. A prerequisite with such an image reader is that the divided sections of the image be constantly read in alignment with each other in the main scanning direction, i.e., without a boundary portion between the first and second sections being read in an overlapping condition or in an interrupted or discontinuous condition and without the first and second sections being read in a displaced position relative to each other in the subscanning direction. To meet this prerequisite, the optics and the imaging devices are set with extreme accuracy with respect to their relative position and arrangement.

However, it often occurs that the actual position of a document image to be read is deviated from a predetermined reading position (defined by the document laying surface of a glass platen, for example) due to displacement of the image. Such a deviation results in a change in the distance between the document image and the imaging devices, preventing the image from being accurately focused on the imaging devices. Especially, the deviation causes a boundary portion between the divided sections of the image to be focused in an overlapping condition or in a discontinuous condition in the main scanning direction, critically degrading the read image.

An implementation has been proposed to prevent the boundary portion between two nearby sections from being read in any of the above-mentioned undesirable conditions even if the actual position of the document image is deviated from the predetermined reading position. The implementation consists in bisecting a document image to be read into a first and a second section by using a half-mirror in such a manner that the mirror transmits the first section and reflects the second section. A drawback with this kind of scheme is that it is not feasible for high-speed reading due to characteristics particular to the half-mirror and, moreover, it is extremely limited with respect to high-density pixel reading available.

SUMMARY OF THE INVENTION

It is therefore an object of the present invention to provide an image reader free from the drawbacks particular to the prior art as discussed above.

It is another object of the present invention to provide an image reader which prevents reading a document image in an overlapping condition or in a discontinuous condition and is therefore capable of reading a document image with accuracy.

It is another object of the present invention to provide a generally improved image reader.

In accordance with the present invention, an image reading apparatus for reading an image of a document, which is set in a reading position and formed in a main scanning direction of the document, by dividing the image into a plurality of sections and causing focusing lenses each being assigned to a respective one of the sections of the image to focus the section onto a respective one of solid-state imaging devices in a reduced scale comprises a displacement detecting device for detecting a displacement of the document from the reading position, and a correcting device for causing, in response to the detected displacement, the sections of the image to be individually focused on predetermined effective pixel range for reading of the imaging devices.

Also, in accordance with the present invenion, an image reading apparatus for reading an image of a document, which is set at a reading position and formed in a main scanning direction of the document, by dividing the image into a plurality of sections, causing an illuminating device mounted on a first carriage to illuminate the respective sections, and causing two mirrors mounted on a second carriage perpendicularly to each other with respect to an optical path to reflect reflections from the sections while causing focusing lenses each being assigned to a respective one of the sections of the image to focus the associated section onto a respective one of solid-state imaging devices in a reduced scale comprises a displacement detecting device for detecting a displacement of the document from the reading position, and a second carriage moving device for moving the mirrors of the second carriage along the optical axis by an amount which is one half of the detected displacement of the document.

Further, in accordance with the present invention, an image reading apparatus for reading an image of a document, which is set in a reading position and formed in a main scanning direction of the document, by dividing the image into a plurality of sections and causing focusing lenses each being assigned to a respective one of the sections of the image to focus the section onto a respective one of solid-state imaging devices in a reduced scale comprises a document sensing device for sensing one edge of the document, and a body for pressing, in response to a sense output of the document sensing device, a back surface of the document to accurately position the image of the document in the reading position.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
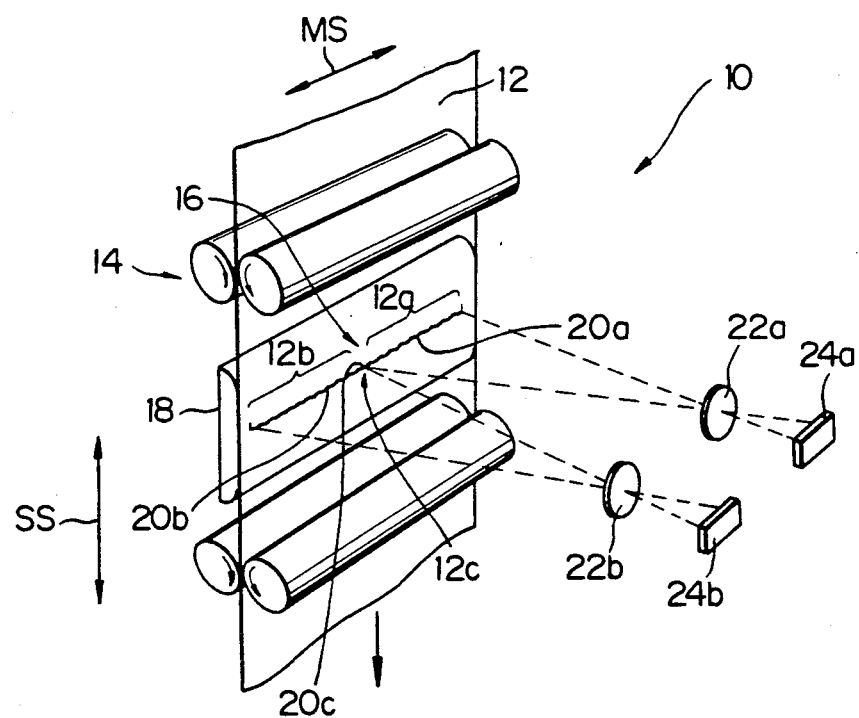
FIG. 1 is a perspective view exemplarily showing a prior art image reader.

To better understand the present invention, a brief reference will be made to a prior art image reader, shown in FIG. 1. The image reader 10 shown in the figure is of a so-called sheet-through type and is disclosed in, for example, Japanese Patent Laid-Open Publication (Kokai) 54-6713. As shown in FIG. 1, a document 12 is driven by a first transport roller pair 14 to a reading position 16 and supported by a back positioning plate 18 in this region 16. In this condition, an image printed on the document is divided into substantially equal sections 12a and 12b in the main scanning direction MS. Focusing lenses 22a and 22b are positioned side by side in the main scanning direction MS to focus respectively the image portions 20a and 20b lying in the sections 12a and 12b onto their associated solid-state imaging devices 24a and 24b in a reduced scale. The document 12 being read is sequentially transported by a second transport roller pair 26 in the subscanning direction SS, whereby the entire image on the document 12 is read out.

The lenses 22a and 22b and the imaging devices 24a and 24b are positioned and arranged with extreme accuracy relative to each other. This is to prevent the image portions 20a and 20b of the sections 12a and 12b from moving up and down independently of each other and to prevent them from being read in an overlapping condition or in an interrupted condition at a portion where the image portions 20a and 20b join each other, i.e., at boundary 20c. However, once the document 12 which is transported in the subscanning direction SS is caused to rise, it is taken out of a correct reading position defined in the image reading region 16 with the result that the distance between the image portions 20a and 20b and their associated imaging devices 24a and 24b is varied. This prevents the image portions 20a and 20b from being accurately focused on the imaging devices 24a and 24b. Especially, an image portion 20c positioned at the boundary 12c is read in an overlapping condition or in a discontinuous condition.

Figure 2:
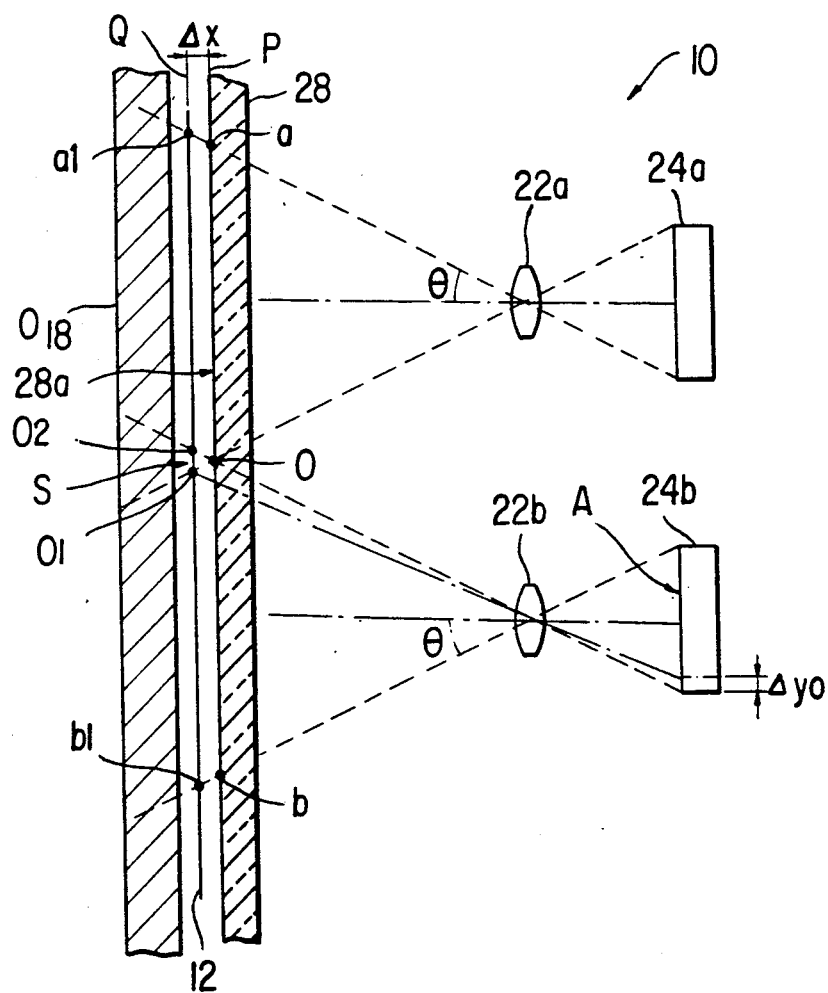
FIG. 2 is a schematic view useful for understanding an image reading operation.

The problem discussed above will be described more specifically with reference to FIG. 2. In FIG. 2, the document 12 is shown as being displaced by a distance of $\Delta x$ (usually 0.2 millimeters to 0.5 millimeters) from a predetermined reading position P which is defined on a glass platen 28. So long as the reading condition is normal, the document 12 is held in close contact with the document laying surface 28a of the glass platen 28 and, therefore, its image is located at the correct reading position P. In this condition, the image portion 20a (see FIG. 1) lying in the section 12a between points O and a on the surface 28a of the glass platen 28 in the position P is read by the imaging device 24a while the image portion 20b (see FIG. 2) lying in the section 12b between points O and b is read by the imaging device 24b. Assume that the document 12 being transported in the subscanning direction SS is raised away from the glass platen 28 so that its image surface is displaced by $\Delta x$ away from the correct reading position P to a position Q. Then, the imaging device 24a will read the area between points $O_1$ and $a_1$ and the imaging device 24b will read the area between points $O_2$ and $b_1$. As a result, the overlapping area S between the points $O_1$ and $O_2$ will be focused onto the imaging device 24b in the form of an overlapping area $\Delta y_0$. The displacement $\Delta x$ of the image surface of the document 12 from the correct reading position P and the overlapping area $\Delta y_0$ focused on the imaging device 24b as stated above are related to each other as discussed hereinafter by using specific numerical values.

Assume that the displacement $\Delta x$ is 0.5 millimeters, the magnification 1/m is 1/10, and the half angle $\theta$ of an image is 20 degrees. Then, the overlapping area $\Delta y_0$ on the imaging device 24b is expressed as:

$$\Delta y_0 = \Delta x \cdot (2 \tan \theta / m) \qquad \text{Eq. (1)}$$

Hence, $$\begin{aligned} \Delta y_o &= 0.5 \cdot (2\tan 20°/10) \\ &\approx 0.0364 \text{ mm} \\ &\approx 36 \ \mu\text{m} \end{aligned} \qquad \text{Eq. (2)}$$

It will therefore be seen that the image portion in the overlapping area S of the document 12 defined by the points $O_1$ and $O_2$ is focused on the imaging device 24b over an area of 36 microns.

Figure 3:
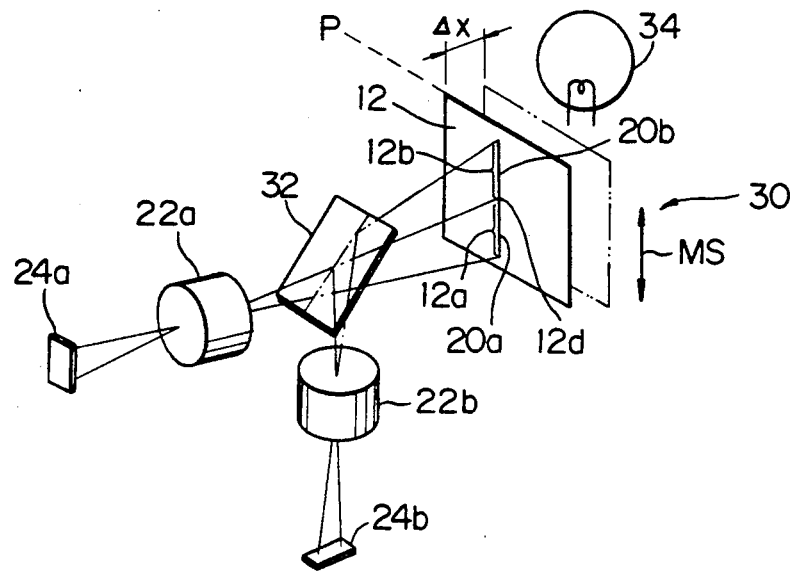
FIG. 3 is a perspective view showing another prior art image reader.

FIG. 3 shows an image reader constructed and arranged to eliminate the above-discussed problem, as disclosed in Japanese Patent Laid-Open Publication (Kokai) No. 59-52965. As shown, the image reader, generally 30, includes a half-mirror 32 and the imaging devices 24a and 24b which are located perpendicularly to each other with respect to the half-mirror 32. An image on the document 12 is divided into two sections 12a and 12b in the main scanning direction MS at the intermediate point 12d. A beam incident to the image portion 20a lying in the section 12a is transmitted through the half-mirror 32 to reach the imaging device 24a, and a beam incident to the image portion 20b in the section 12b is reflected by the half-mirror 32 and then reaches the imaging device 24b via the lens 22b. In this configuration, even if the document 12 is displaced from the predetermined reading position P by the distance $\Delta x$, the beam representative of the document image is constantly focused on the imaging devices 24a and 24b by being split into two. This allows the entire image on one scanning line of the document 12 to be accurately read in the form of two sections which join each other at the intermediate point 12d, without overlapping each other or being interrupted.

The above-described type of image reader, however, cannot be implemented without using the half-mirror 32 for splitting the beam and, since the quantity of light is limited due to the illuminance available with of an illuminating unit 34 and the sensitivity of the imaging devices 24a and 24b, it is incapable of reading an image at a high speed. Another drawback is that loads on the lenses 22a and 22b (wide angle, high resolution, etc) are extremely heavy because the document image is divided at the intermediate point 12d only, limiting the high-density pixel reading capability. Furthermore, the bisection at the intermediate point 12d cannot adapt itself to a wider and denser reading system.

Preferred embodiments of the present invention which eliminate the drawbacks particular to the prior art will be described with reference to the accompanying drawings. In the illustrative embodiments, the same or similar structural elements as those shown in FIGS. 1 to 3 are designated by like reference numerals.

FIRST EMBODIMENT

Figure 4A:
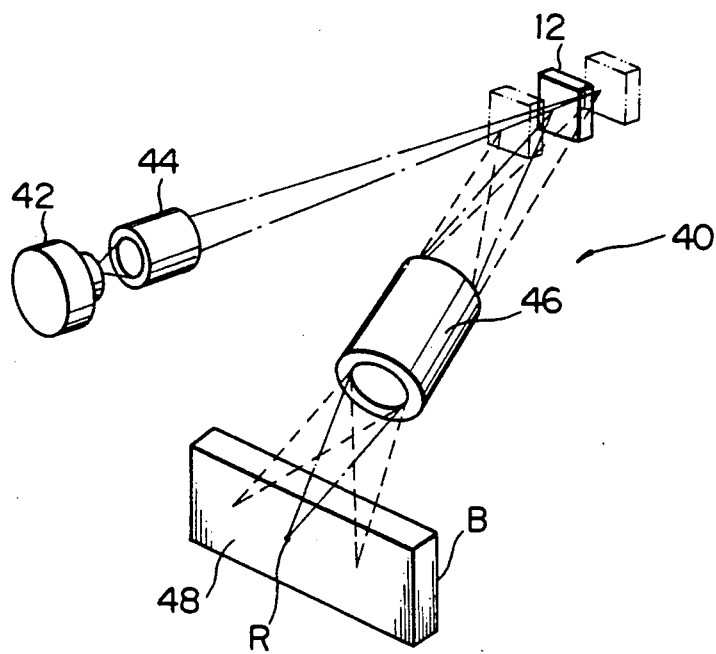
FIG. 4A is a perspective view of a specific arrangement applicable to any of preferred embodiments of the present invention for detecting a displacement of a document.
Figure 4B:
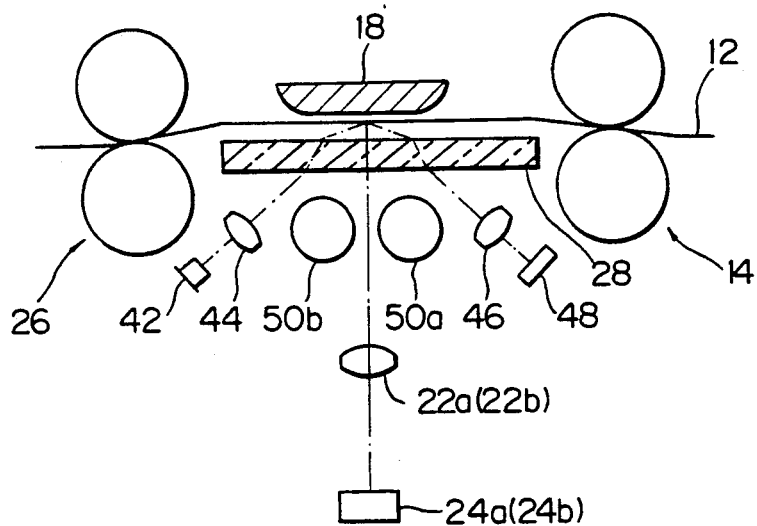
FIG. 4B is a schematic overall view of any of the embodiments of the present invention in which the arrangement of FIG. 4A is installed.
Figure 5:
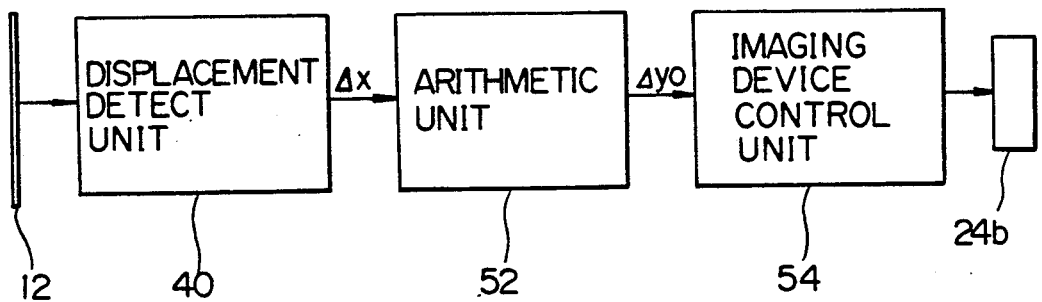
FIG. 5 is a block diagram schematically showing a control system associated with a first embodiment of the present invention.
Figure 6:
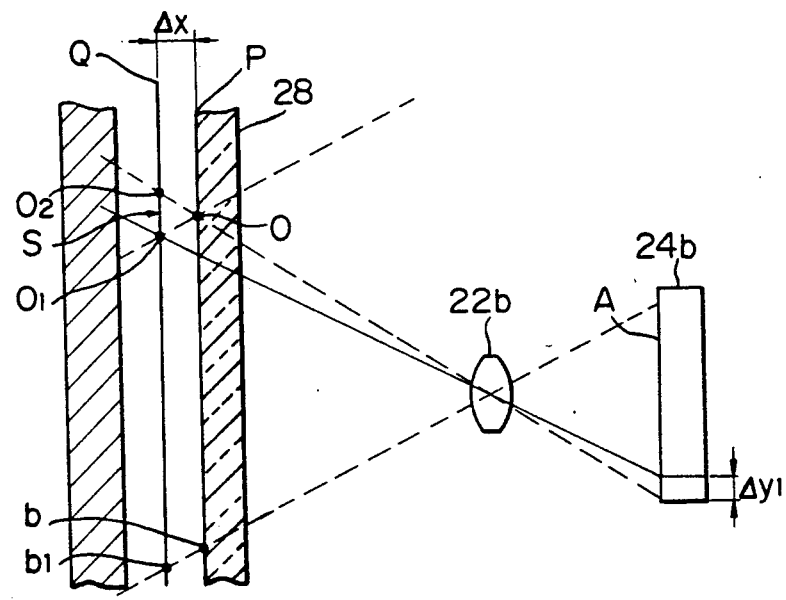
FIG. 6 is a view showing a modification to the first embodiment.

A first embodiment of the present invention will be described with reference to FIGS. 2, 4A, 4B, 5 and 6. FIG. 4A shows a displacement detecting arrangement 40 responsive to a displacement $\Delta x$ of the document 12 as measured from the predetermined reading position P on the surface 28a of the glass platen 28 (FIG. 2) to the position Q. As shown in FIG. 4a, the device 40 is made up of a semiconductor laser 42, an illuminating lens 44, a focusing lens 46, and a photosensor 48. FIG. 4B shows the overall construction of the illustrative embodiment in which the arrangement 40 is installed. Labeled 50a and 50b in FIG. 4B are light sources. When light issuing from the light sources 50a and 50b enters the device 40 to constitute noise, a filter which transmits only infrared rays involved in the arrangement 40 may be inserted between the focusing lens 46 and the photosensor 48. In this particular embodiment, an effective pixel area for reading A on the imaging device 24a (see FIG. 2) is variable depending upon the displacement $\Delta x$ of the document 12 which is detected by the arrangement 40. Specifically, as shown in FIG. 5, when the arrangement 40 generally represented by a displacement detecting unit detects a displacement $\Delta x$ of the document 12, an arithmetic unit 52 calculates the overlapping area $\Delta y_0$ on the imaging device 24b (FIG. 2) on the basis of the displacement $\Delta x$ and by using Eq. (1). Then, an imaging device control unit 54 drives the imaging device 24b such that the effective pixel area A of the latter is varied complementarily to the overlapping area $\Delta y_0$. The imaging device control unit 54 may be so constructed as to inhibit an output from that part of the area A of the imaging device 24b where the overlapping image portion is focused, for example.

In detail, assume that the document 12 is located at the position Q which is spaced a part by $\Delta x$ from the predetermined reading position P, as shown in FIG. 2. In FIG. 4a and 4b, a beam issuing from the semiconductor laser 42 of the displacement detecting unit 40 is incident to the surface of the document 12 while being restricted by the illuminating lens 44. A portion of the light reflected and diffused, depending upon the surface condition of the document 12, is incident to a light-sensitive surface B of the photosensor 48 to form an image of a reflected point R. As the document 12 is moved toward or away from the lens 44, the image of the reflected point R is also moved on the photosensor 48. The resulting electrical output of the photosensor 48 is representative of a particular position where the reflected point R is incident and, therefore, a displacement $\Delta x$ of the document 12. The displacement $\Delta x$ so detected by the displacement detecting unit 40 is applied to the Eq. (1) to determine an overlapping area $\Delta y_0$ by the arithmetic unit 52, shown in FIG. 5. Based on the determined overlapping area $\Delta y_0$, the imaging device control unit 54 drives the imaging device 24b such that the effective pixel area or reading area A on the device 24b is reduced by the overlapping area $\Delta y_0$. As a result, the image in the overlapping area S of the document 12 is read as a non-overlapping clear-cut image on the imaging device 24b. More specifically, in FIG. 2, the imaging devices 24a and 24b read respectively an image portion lying between the points $a_1$ and $O_1$ of the document 12 and an image portion lying between the points $O_1$ and $b_1$. This prevents an image portion in the overlapping area S between the points $O_1$ and $O_2$ from being read.

While the correct reading position P is implemented as the surface 28a of the glass platen 28 in the illustrative embodiment, the effective pixel area A may be reduced at the design stage in matching relation to the overlapping area $\Delta y_0$ on the imaging device 24b and by providing some degree of field depth.

It is to be appreciated that the illustrative embodiment is applicable not only to a sheet-through type image reader shown and described but also to a sheet-stationary type image reader. In the latter application, the displacement detecting unit 40 and the like will be constructed to be movable integrally with a series of illuminating devices.

Further, the displacement detecting unit 40 shown in FIG. 4 is only illustrative. The arithmetic unit 52 and imaging device control unit 54 may of course be implemented by any of various schemes which are known in the art.

SECOND EMBODIMENT

Figure 7:
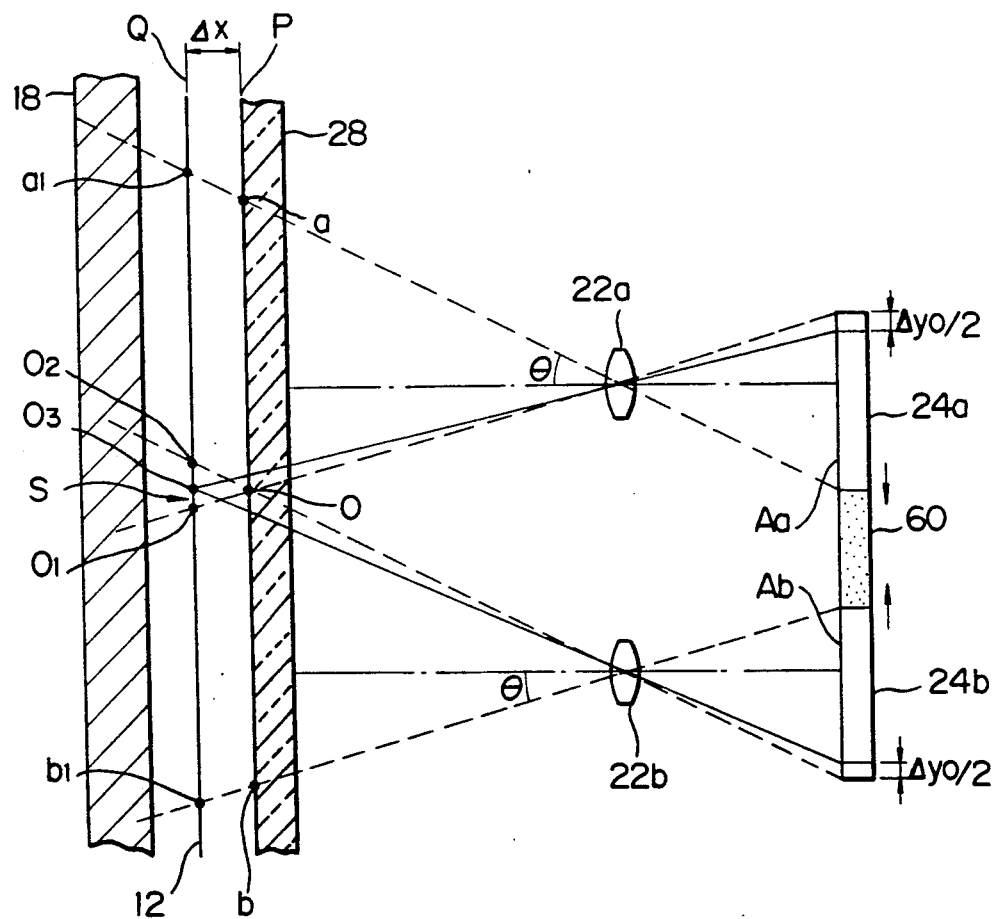
FIGS. 7 and 8 are views showing a second embodiment of the present invention.
Figure 8:
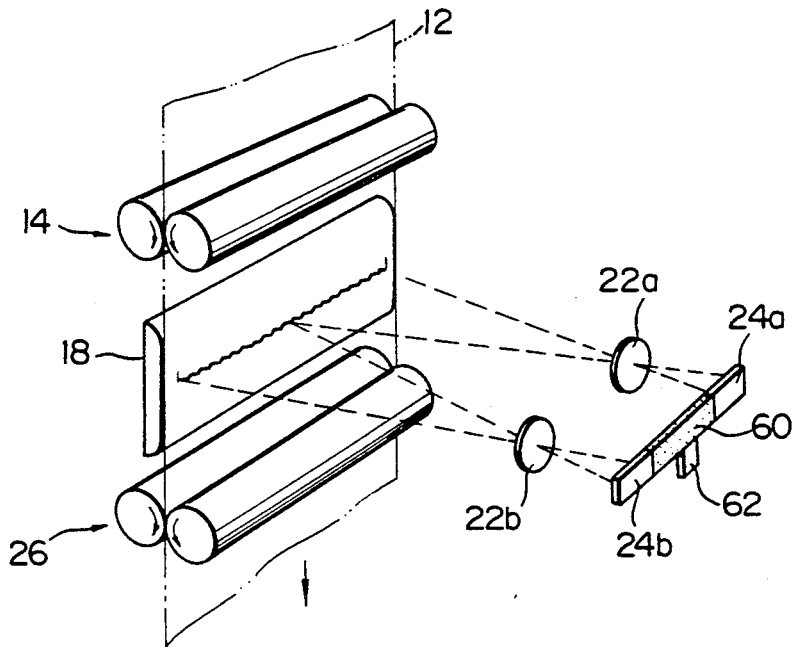

A second embodiment of the present invention is shown in FIGS. 7 and 8. This embodiment can also be implemented by the displacement detecting unit 40 and arithmetic unit 52 (FIGS. 4A, 4B and 5) and will therefore be discussed as using them.

As shown, this particular embodiment includes a piezoelectric element 60 which is interposed between the imaging devices 24a and 24b. The piezoelectric element 60 is supported by a support member 62 and is expansible in association with the displacement $\Delta x$ of the document 12 which is detected by the unit 40. This causes the imaging devices 24a and 24b to move toward and away from each other as indicated by arrows in FIG. 7, thereby varying effective pixel area or reading areas Aa and Ab on the imaging devices 24a and 24b.

More specifically, in FIG. 7, assume that the document 12 is located at the position Q which is spaced apart by $\Delta x$ from the predetermined reading position P. As shown in FIGS. 4A and 4B, a beam issuing from the semiconductor laser 42 of the displacement detecting unit 40 is incident to the surface of the document 12 while being restricted by the illuminating lens 44. A portion of the light reflected and diffused, depending upon the surface condition of the document 12, is incident to a light-sensitive surface B of the photosensor 48 via the lens 46 to form an image of a reflected point R. As the document 12 is moved toward or away from the lens 44, the image of the reflected point R is also moved on the photosensor 48. The resulting electrical output of the photosensor 48 shows a particular position where the reflected point R is incident and, therefore, a displacement $\Delta x$ of the document 12. The displacement $\Delta x$ so detected by the displacement detecting unit 40 is applied to the Eq. (1) to determine an overlapping area $\Delta y_0$ by the arithmetic unit 52. Based on the determined overlapping area $\Delta y_0$, the imaging device control unit 54 shown in FIG. 5 causes the piezoelectric element 60 to contract so as to move the imaging devices 24a and 24b to each other, as indicated by arrows in FIG. 7. By determining the displacement of each of the imaging devices 24a and 24b to be one half of the overlapping area $\Delta y_0$, the document 12 is bisected at the point of intersection $O_3$ on the document 12 to prevent the image in the overlapping area S from being read as an overlapping image. When the piezoelectric element 60 is contracted as stated, the imaging devices 24a and 24b read respectively an area of the document 12 between points the $a_1$ and $O_3$ and an area between the points $O_3$ an $b_1$, i.e., an area between the points $O_1$ and $O_2$ is not read.

Again, the illustrative embodiment is applicable not only to a sheet-through type image reader shown and described but also to a sheet-stationary type image reader. In the latter application, the displacement detecting unit 40 and the like will be constructed to be movable integrally with a series of illuminating devices.

The arithmetic unit 52 and imaging device control unit 54 may of course be implemented by any of known constructions and arrangements.

THIRD EMBODIMENT

Figure 9:
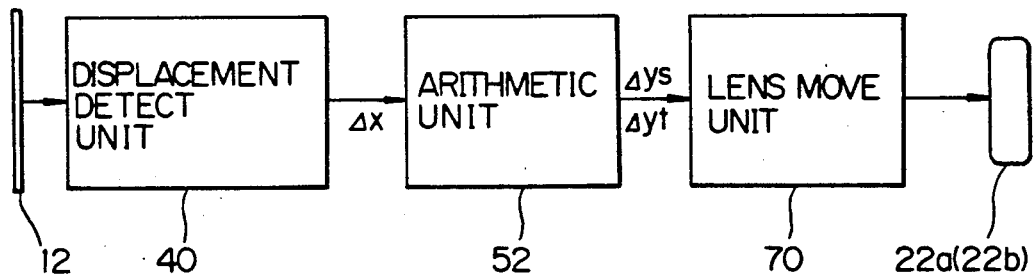
FIG. 9 is a block diagram schematically showing a control system associated with a third embodiment of the present invention.
Figure 10:
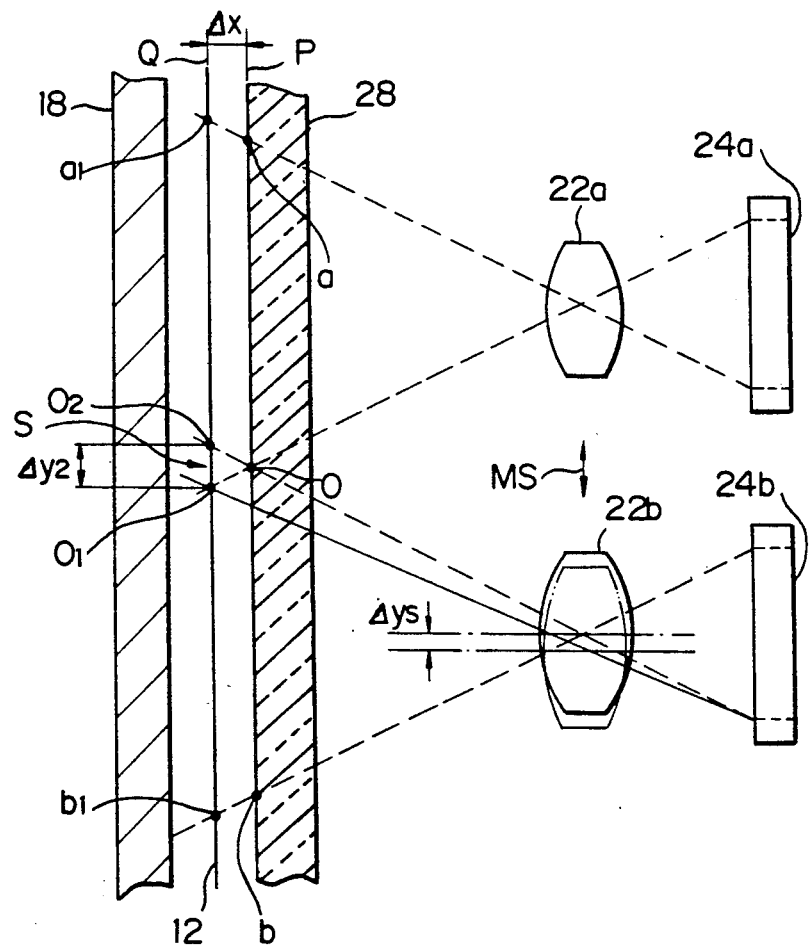
FIGS. 10 and 11 are views showing the construction of the third embodiment.
Figure 11:
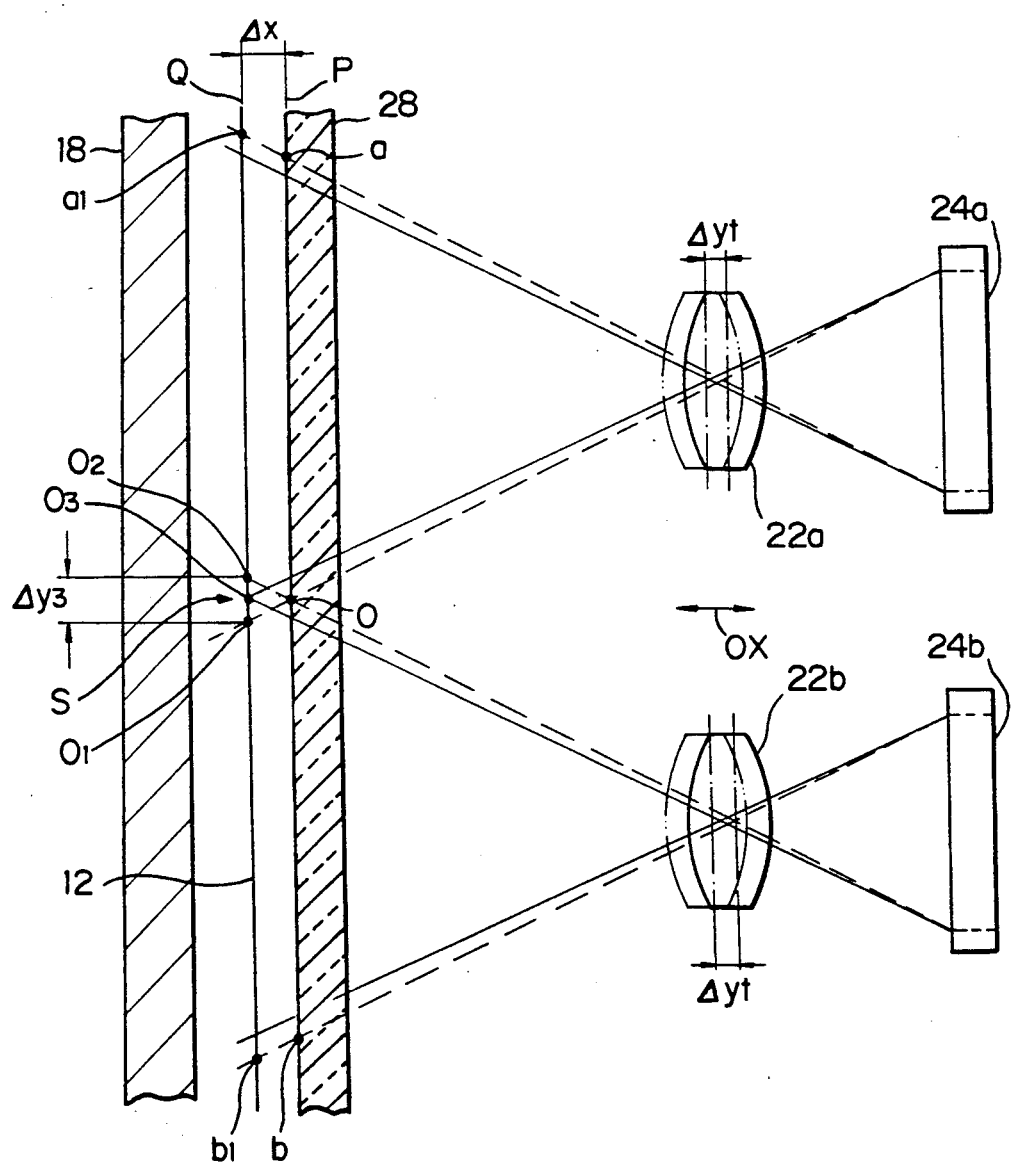

A third embodiment of the present invention is shown in FIGS. 9, 10 and 11. This embodiment can also be implemented with the displacement detecting unit 40 and arithmetic unit 52 (FIGS. 4A, 4B and 5) and is therefore assumed as using them.

As shown in FIG. 9, this particular embodiment includes a lens moving unit 70. This unit 70 moves the focusing lenses 22a ad 22b in the main scanning direction MS (FIG. 10) or along the optical axes OX of the lenses 22a and 22b (FIG. 11) as needed, depending upon the displacement $\Delta x$ of the document 12 detected by the displacement detecting unit 40.

More specifically, in FIGS. 10 and 11, assume that the document 12 is located at the position Q which is spaced apart by $\Delta x$ from the predetermined reading position P. A beam issuing from the semiconductor laser 42 of the displacement detecting unit 40 is incident to the surface of the document 12 while being restricted by the illuminating lens 44. A portion of the light reflected and diffused, depending upon the surface condition of the document 12, is incident to the light-sensitive surface B of the photosensor 48 via the lens 46 to form an image of a reflected point R. As the document 12 is moved toward or away from the lens 44, the image of the reflected point R is also moved on the photosensor 48. The resulting electrical output of the photosensor 48 shows a particular position where the reflected point R is incident and, therefore, a displacement $\Delta x$ of the document 12. The displacement $\Delta x$ so detected by the displacement detecting unit 40 is applied to the Eq. (1) to determine an overlapping area $\Delta y_0$ by the arithmetic unit 52. Based on the determined overlapping area $\Delta y_0$, the lens moving unit 70 moves the focusing lenses 22a and 22b to read the document with accuracy. Two different methods are available for moving the focusing lenses 22a and 22b: one which moves them in the main scanning direction MS of the document 12 and the other which moves them along the optical axes OX perpendicular to the surface of the document 12.

The first-mentioned method will be described first, with reference to FIG. 10. Based on the displacement $\Delta x$ determined by the displacement detecting unit 40, the arithmetic unit determines a distance $\Delta y_2$ between the points $O_1$ and $O_2$ of the overlapping area S on the document 12 and, by using the distance $\Delta y_2$, calculates a displacement $\Delta y_s$ of the lens 22b which the lens moving unit 70 is to cause, as follows:

$$\Delta y_s = \Delta y_2 \cdot \{1/(1+1/m)\} \quad \text{Eq. (3)}$$

where m denotes a magnification.

The lens moving unit 70 moves the focusing lens 22b in the main scanning direction MS by the displacement $\Delta y_s$ determined as stated above.

The second-mentioned method will be discussed with reference to FIG. 11. In this case, too, the arithmetic unit 52 calculates a distance $\Delta y_3$ between the points $O_1$ and $O_2$ of the overlapping area S on the document 12 on the basis of the displacement $\Delta x$ and, then, determines a displacement $\Delta y_t$ of the optical axes OX of lenses 22a and 22b to occur on the basis of the distance $\Delta y_3$, as represented by:

$$\Delta y_t = \Delta y_3 \cdot \{1/(1+1/m)\} \quad \text{Eq. (4)}$$

where m is a magnification.

The lens moving unit 70 moves the focusing lenses 22a and 22b by the displacement $\Delta y_t$ along the optical axes OX. This eliminates the area intervening between the points $O_1$ and $O_2$ on the document 12, i.e., the document 12 is bisected at the point $O_3$.

With either of the two methods described above, it is possible to determine a displacement $\Delta y_s$ or $\Delta y_t$ of the lenses 22a and 22b which should be effected and, based on this amount $\Delta y_s$ or $\Delta y_t$, to move the focusing lenses 22a and 22b to guarantee accurate image read-out.

It is to be noted that the arithmetic unit 52 and lens moving unit 70 may of course be implemented by any known conventional constructions and arrangements.

FOURTH EMBODIMENT

Figure 12:
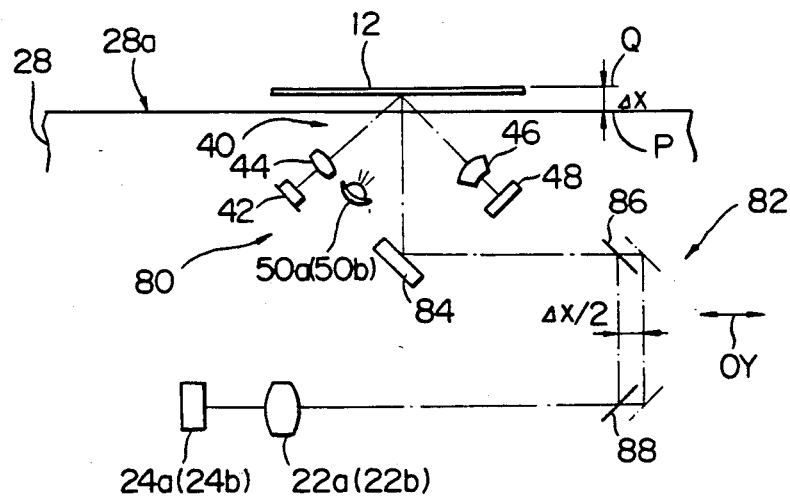
FIG. 12 is a view showing a fourth embodiment of the present invention.

This embodiment is implemented as a document-stationary type image reader and, like the previous embodiments, uses the displacement detecting unit 40 (FIGS. 4A and 4B). As shown in FIG. 12, the image reader includes a first carriage 80 and a second carriage 82. The first carriage 80 is loaded with a light source in the form of halogen lamps 50a and 50b, a mirror 84, and the displacement detecting unit 40. On the other hand, the second carriage 82 is loaded with two mirrors 86 and 88 which are perpendicular to each other on the optical path. The imaging devices 24a and 24b are also located on the optical path via the focusing lenses 22a and 22b. The second carriage 82 is driven by a second carriage driving unit 90 (FIG. 13) to move along an optical axis OY. The driving unit 90 moves the mirrors 86 and 88 in the direction OY by one half of a displacement Δx of the document 12 which is determined by the displacement detecting unit 40, i.e. ½ Δx.

Figure 13:
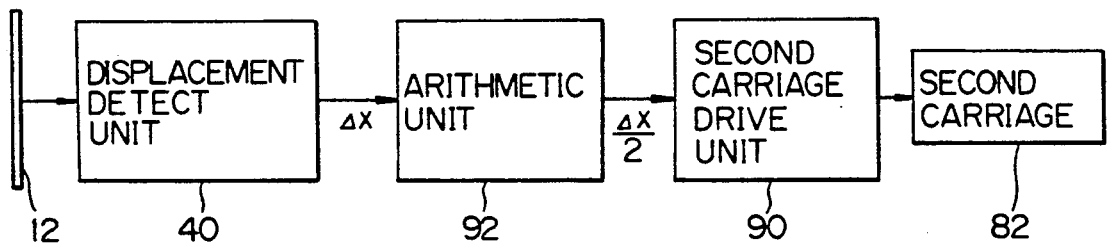
FIG. 13 is a schematic block diagram showing a control system associated with the fourth embodiment.

As shown in FIG. 12, assume that the document 12 is located at the position Q which is spaced apart by Δx from the predetermined reading position P on the surface 28a of the glass platen 28. Then, the first carriage 80 is moved to the position where the document 12 is set while reading the document 12. At this instant, the displacement detecting unit 40 produces an electrical output representative of the displacement Δx of the document 12. As shown in FIG. 13, an arithmetic unit 92 produces one half of the displacement Δx, i.e. ½ Δx. The second carriage driving unit 90 drives the two mirrors 86 and 88 of the second carriage 82 in the direction OY on the basis of the determined displacement ½ Δx. Consequently, the overall length of the optical path is corrected and, therefore, imagewise light reflected by the document 12 is accurately read by the imaging devices 24a and 24b via the focusing lenses 22a and 22b.

It is to be noted that the arithmetic unit 92 and second carriage driving unit 90 may of course be implemented by any of known constructions and arrangements.

FIFTH EMBODIMENT

Figure 14:
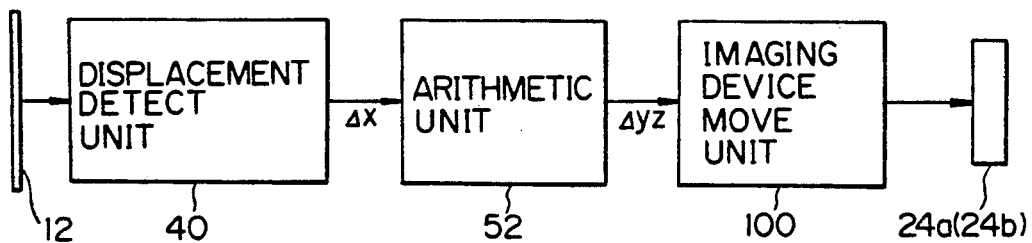
FIG. 14 is a schematic block diagram showing a control system associated with a fifth embodiment of the present invention.
Figure 15:
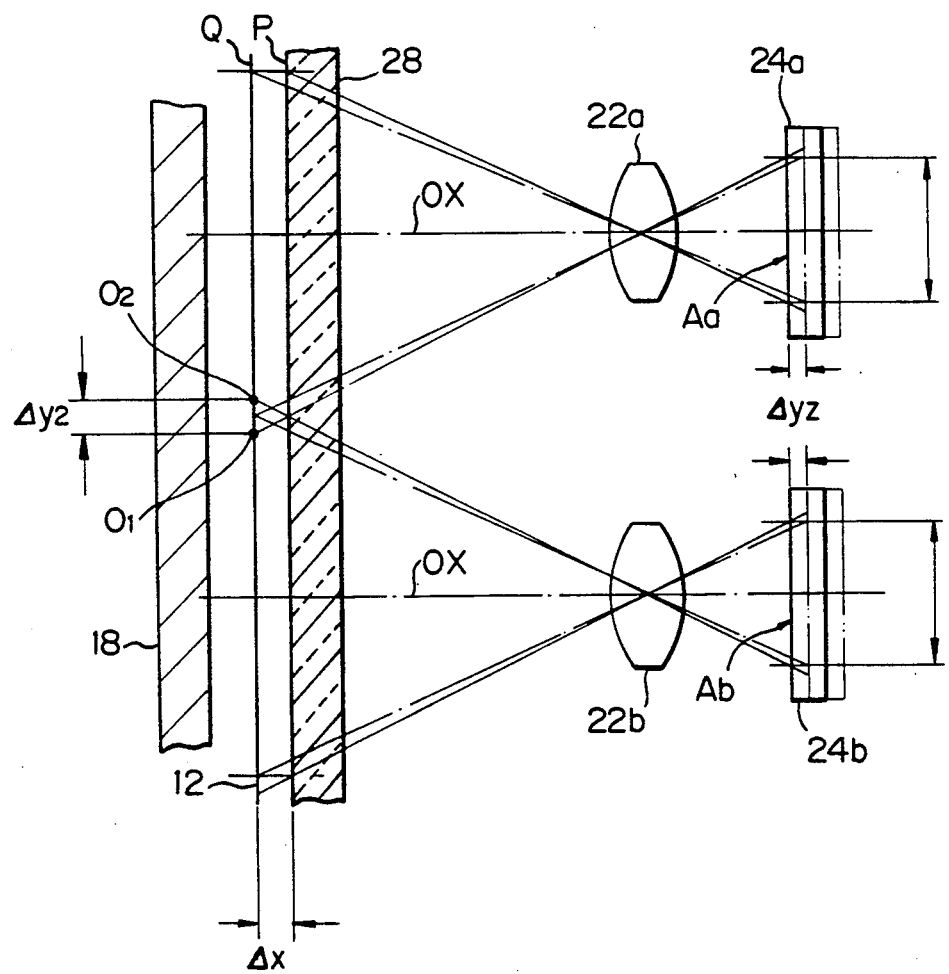
FIG. 15 is a view showing the construction of the fifth embodiment.
Figure 16:
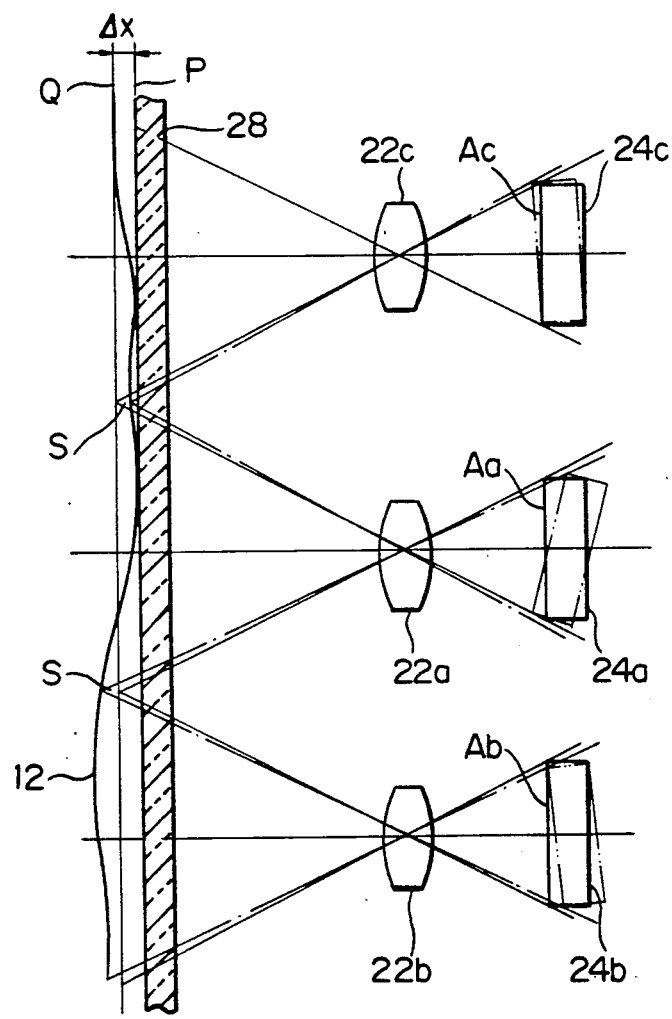
FIG. 16 is a view showing a modification of the fifth embodiment of the present invention.

A fifth embodiment of the present invention is shown in FIGS. 14 to 16. This embodiment also uses the displacement detecting unit 40 and arithmetic unit 52. As shown in FIG. 14, the image reader includes an imaging device moving unit 100 for varying the position of the imaging devices 24a and 24b. Specifically, the imaging device moving unit 100 is constructed to move the imaging devices 24a and 24b along the optical axes OX of the latter in association with the displacement Δx of the document 12 which is determined by the displacement detecting unit 40.

In detail, assume that the document 12 is located at the position Q which is spaced apart by Δx from the predetermined reading position P. As shown in FIGS. 4A and 4B, a beam issuing from the semiconductor laser 42 of the displacement detecting unit 40 is incident to the surface of the document 12 while being restricted by the illuminating lens 44. A portion of the light reflected and diffused, depending upon the surface condition of the document 12, is incident to a light-sensitive surface B of the photosensor 48 via the lens 46 to form an image of a reflected point R. As the document 12 is moved toward or away from the lens 44, the image of the reflected point R is also moved on the photosensor 48. The resulting electrical output of the photosensor 48 shows a particular position where the reflected point R is incident and, therefore, a displacement Δx of the document 12. The arithmetic unit 52 produces a distance Δy$_2$ between the points O$_1$ and O$_2$ of the overlapping area S on the document 12 by using the displacement Δx and, then, produces a displacement Δyz of the imaging devices 24a and 24b which is to be effected by the moving unit 100 in the direction OX, as follows:

$$\Delta yz = m^2 \cdot \Delta x \qquad \text{Eq. (5)}$$

where m is a magnification.

As stated above, the imaging device moving unit 100 moves the imaging devices 24a and 24b in the direction OX on the basis of the displacement Δyz determined by the arithmetic unit 52, thereby varying the respective effective pixel or reading areas Aa and Ab.

A modification to the fifth embodiment is shown in FIG. 16. In FIG. 16, use is made of three focusing lenses and three imaging devices which are associated one-to-one with each other. In this case, the document 12 will be read in three sections and therefore with higher density and in a larger number of pixels. Again, to allow the overlapping area S of the document 12 to be read with accuracy, the displacement detecting unit 40 determines a displacement Δx of the document 12 from the predetermined position P while the imaging device moving unit 100 moves, based on the displacement Δx, three independent imaging devices 22a, 22b and 22c to thereby vary their effective pixel areas Aa, Ab and Ac.

It will be apparent that the imaging device moving unit 100 may readily be implemented by any of known constructions and arrangements known in the art.

SIXTH EMBODIMENT

Figure 17:
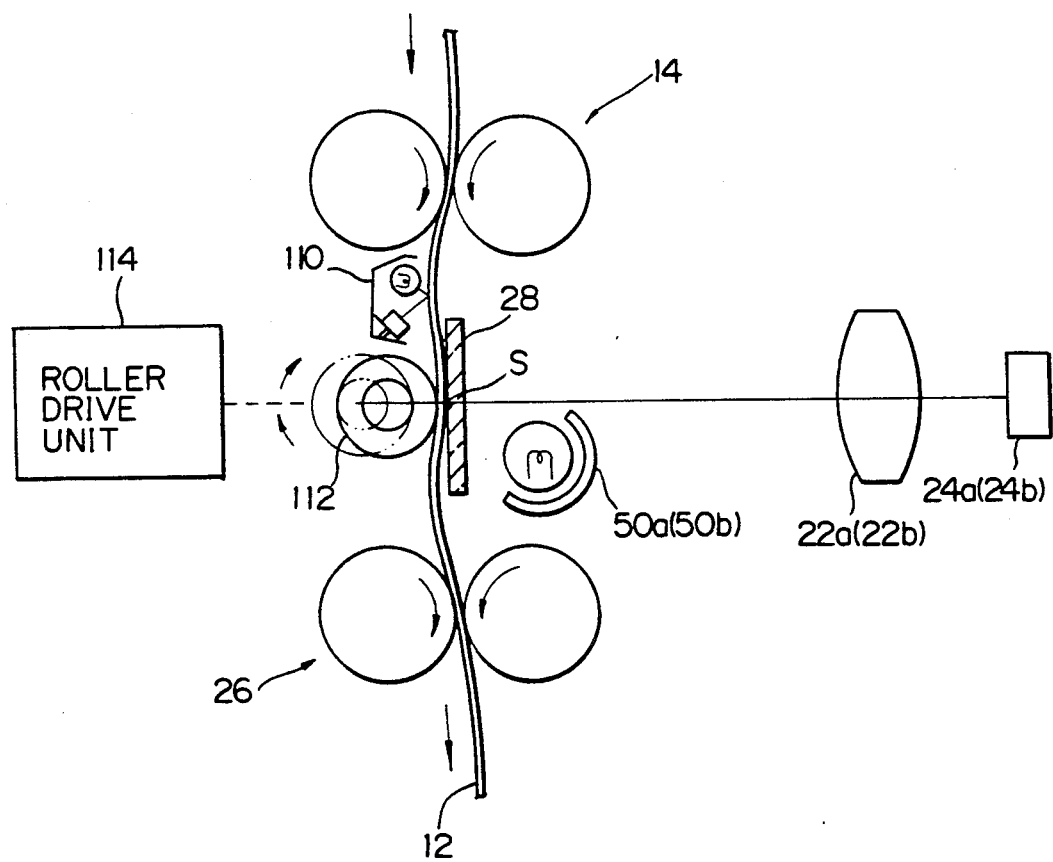
FIGS. 17-19 is a view showing a sixth embodiment of the present invention.
Figure 18:
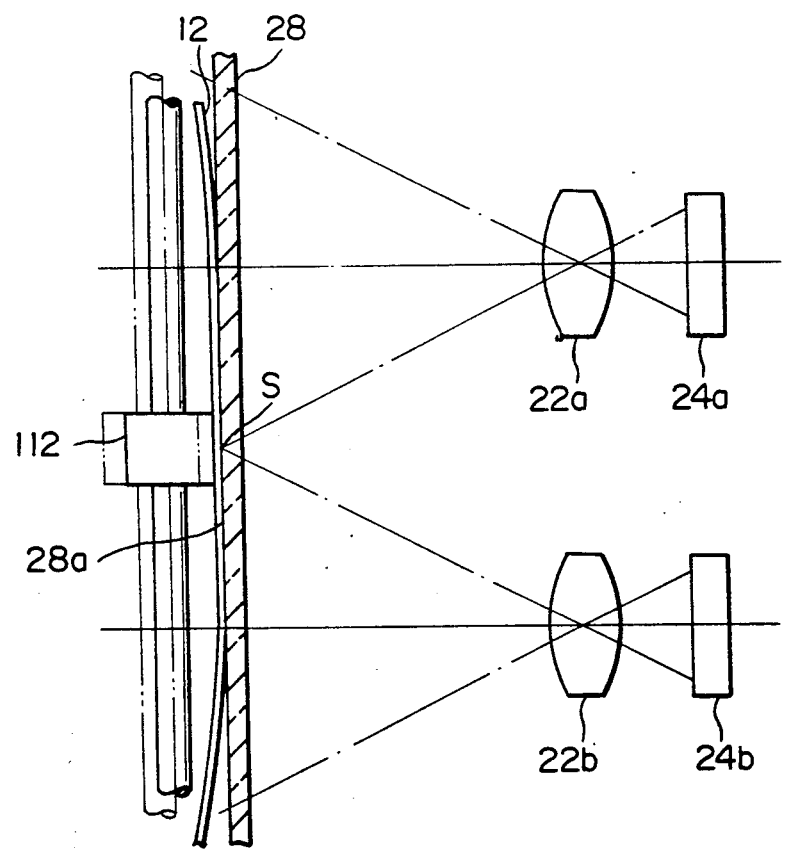
Figure 19:
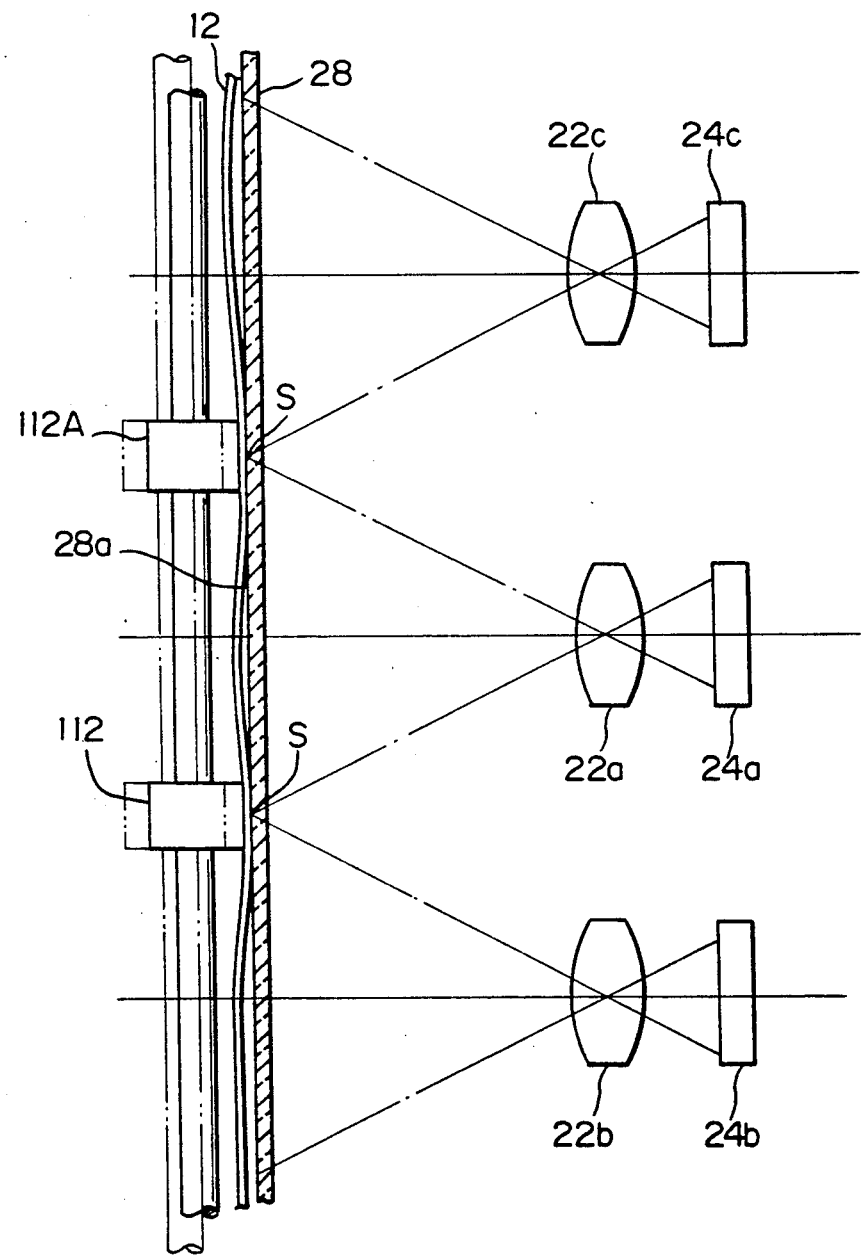

Referring to FIGS. 17 to 19, a sixth embodiment of the present invention is shown. As shown in FIGS. 17 and 18, this embodiment includes a document sensor 110 for sensing the leading edge of the document 12, and a document presser 112 adapted to press the document 12 against the surface 28a of the glass platen 28. The document sensor 110 is located in the vicinity of the transport roller pair 14 which drives the document 12 toward the reading region. The document presser 112 is implemented as a roller 112 which is located in a position corresponding to the overlapping area S where the the imaging devices 24a and 24b are apt to read a document image in an overlapping condition. When the document is fed by the transport roller pair 14 as indicated by an arrow, its leading edge is sensed by the document sensor 110. After an image on the document 12 is accurately located at a reading position, the roller 112 is driven by a roller driving unit 114 to press the document 12 against the glass platen 28. As a result, an image portion lying in the overlapping area of the document 12 is held in close contact with the surface 28a of the glass platen 28 by the roller 112 and thereby read with accuracy. As soon as the trailing edge of the document 12 is sensed by the sensor 110, the roller 112 is moved away from the document 12 to regain a stand-by position as indicated by a dash-and-dots line in the figures.

FIG. 19 shows a modification to the sixth embodiment which uses three focusing lenses and three imaging devices. In this modification, the roller 112 and a roller 112A are individually movably located in those positions corresponding to the overlapping areas S of the document 12. This alternative configuration is also effective in allowing image portions lying in the overlapping areas S to be read out with accuracy.

In the modification shown and described, the rollers 112 and 112A may each be provided with a light diffusing surface having high reflectivity. This will allow an image of relatively small size to be read without the fear of producing solid black areas.

It is to be noted that the document sensor 100 and roller driving unit 114 may of course be implemented by any of known constructions and arrangements.

Various modifications will become possible for those skilled in the art after receiving the teachings of the present disclosure without departing from the scope thereof.

What is claimed is:

1. An image reading apparatus for reading an image of a document, which is set in a reading position and formed in a main scanning direction of the document, by dividing the image into a plurality of sections and causing focusing lenses each being assigned to a respective one of the sections of the image to focus the section onto a respective one of solid-state imaging devices in a reduced scale, said apparatus comprising:

displacement detecting means for detecting a displacement of the document from the reading position; and correcting means for causing, in response to the detected displacement, the sections of the image to be individually focused on predetermined effective pixel range for reading of said imaging devices wherein said correcting means includes an effective pixel range varying means for varying the effective pixel range of each of said imaging devices and wherein said effective pixel range varying means includes a piezoelectric element connected between said imaging devices and expansible in association with the displacement of the document to move each of said imaging devices to thereby vary the effective pixel range.

2. An apparatus as claimed in claim 1, wherein said effective pixel range varying means comprises means for inhibiting an output from a range other than the predetermined effective pixel range.

3. An apparatus as claimed in claim 1, wherein said effective pixel range varying means comprises lens moving means for moving said focusing lenses in association with the displacement of the document to thereby vary positions on said imaging devices where the respective sections of the image are focused.

4. An apparatus as claimed in claim 3, wherein said lens moving means moves said focusing lenses in the main scanning direction.

5. An apparatus as claimed in claim 3, wherein said lens moving means moves said focusing lenses along optical axes of said lenses.

6. An apparatus as claimed in claim 1, wherein said effective pixel range varying means comprises imaging device moving means for moving said imaging devices in association with the displacement of the document to thereby vary positions on said imaging devices where the respective sections of the image are focused.

7. An apparatus as claimed in claim 6, wherein said imaging device moving means moves said imaging devices along optical axes of said focusing lenses.

8. An image reading apparatus for reading an image of a document, which is set at a reading position and formed in a main scanning direction of the document, by dividing the image into a plurality of sections, causing an illuminating device mounted on a first carriage to illuminate the respective sections, and causing two mirrors mounted on a second carriage perpendicularly to each other with respect to an optical path to reflect reflections from the sections while causing focusing lenses each being assigned to a respective one of the sections of the image to focus the associated section onto a respective one of solid-state imaging devices in a reduced scale, said apparatus comprising:

displacement detecting means for detecting a displacement of the document from the reading position; and second carriage moving means for moving said mirrors of said second carriage along said optical axis by an amount which is one half of the detected displacement of the document.

9. An image reading apparatus for reading an image of a document, which is set in a reading position and formed in a main scanning direction of the document, by dividing the image into a plurality of sections and causing focusing lenses each being assigned to a respective one of the sections of the image to focus the section onto a respective one of solid-state imaging devices in a reduced scale, said apparatus comprising:

document sensing means for sensing one edge of the document; and a body for pressing, in response to a sense output of said document sensing means, a back surface of the document to accurately position the image of the document in the reading position.

* * * * *